Figure 1:
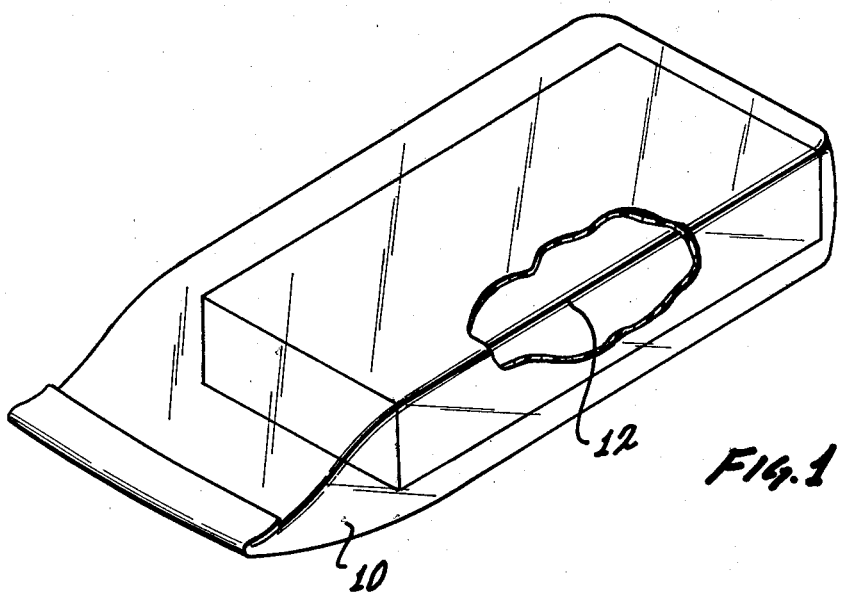

United States Patent [19]

Lybrand

[11] 4,391,952
[45] Jul. 5, 1983

[54] ANTI-STATIC MATERIAL AND METHOD OF MAKING THE MATERIAL

[75] Inventor: William Lybrand, Northridge, Calif.

[73] Assignee: Bengal, Inc., Sepulveda, Calif.

[21] Appl. No.: 327,485

[22] Filed: Dec. 4, 1981

[51] Int. Cl.$^3$ .............................................. C09K 3/16
[52] U.S. Cl. ..................... 525/333.7; 260/DIG. 16; 260/DIG. 19; 260/DIG. 21; 524/398; 524/587; 524/910; 524/912; 525/370; 525/379
[58] Field of Search ............... 524/243, 587, 910, 912, 524/913, 398, 395, 451; 525/333, 335, 379, 380, 360, 370, 333.7; 260/DIG. 16, DIG. 19, DIG. 21

[56]  References Cited

U.S. PATENT DOCUMENTS

| 2,992,199 | 7/1961 | Coler et al. | 260/DIG. 16 |
| 3,223,664 | 12/1965 | Conlon | 260/DIG. 16 |
| 3,223,695 | 12/1965 | Gallaugher | 524/910 |
| 3,299,006 | 1/1967 | Tomiyama et al. | 524/912 |
| 3,365,437 | 1/1968 | Marra et al. | 524/587 |
| 3,435,021 | 3/1969 | Rombusch et al. | 524/587 |
| 3,445,396 | 5/1969 | Funatsu et al. | 524/249 |
| 3,478,096 | 11/1969 | Cyba | 524/243 |
| 3,485,786 | 12/1969 | Rombusch et al. | 524/243 |
| 3,575,903 | 4/1971 | Rombusch et al. | 524/247 |
| 3,631,162 | 12/1971 | McGaugh et al. | 524/247 |
| 3,658,744 | 4/1972 | Brindell et al. | 260/DIG. 19 |
| 3,745,116 | 7/1973 | Brindell et al. | 260/DIG. 15 |
| 3,867,315 | 2/1975 | Tigner et al. | 524/587 |
| 3,975,325 | 8/1976 | Long | 524/913 |
| 4,147,742 | 4/1979 | Castro et al. | 524/223 |
| 4,210,556 | 7/1980 | Castro et al. | 528/212 |
| 4,247,498 | 1/1981 | Castro | 264/49 |
| 4,314,040 | 2/1982 | Castro et al. | 525/391 |

FOREIGN PATENT DOCUMENTS

| 50-2753 | 1/1975 | Japan | 524/587 |
| 519448 | 8/1976 | U.S.S.R. | 524/243 |

Primary Examiner—Ronald W. Griffin
Attorney, Agent, or Firm—Ellsworth R. Roston; Charles H. Schwartz

[57] ABSTRACT

Polyethylene having a relatively high specific gravity is modified to inhibit the production of static charges. A weak salt having properties of ionizing and having its positive ions bond chemically to the polyethylene is mixed in the polyethylene. A chemical agent is also dispersed in the polyethylene and is provided with properties of facilitating the dispersion of the positive ions of the weak salt throughout the polyethylene of high specific gravity for chemical bonding to the polyethylene. The weak salt may be cupric acetate and the chemical agent may be an amine. The amine is preferably ethoxylated. The material of this invention may be formed as non-transparent bags or as sheets. The material may be formed by mixing the different chemicals and extruding the mixture under conditions of controlled temperatures and pressures and for controlled dwell times.

7 Claims, 2 Drawing Figures

U.S. Patent      Jul. 5, 1983      4,391,952

ANTI-STATIC MATERIAL AND METHOD OF MAKING THE MATERIAL

This invention relates to anti-static materials and to methods of producing such materials. More particularly, the invention relates to materials produced by a mixture of thermoplastic materials formed from hydrocarbon chains and of modifying components to inhibit the formation of anti-static charges on or in such thermoplastic meterials. The invention also relates to methods of producing such modified thermoplastic materials. The invention is particularly concerned with the inhibition of static charges in polyethylene of high specific gravity.

Electrical equipments now in use tend to have casings and covers which are made from thermoplastic material such as hydrocarbons in long polymeric chains. Such casings are advantageous because they are attractive and are relatively inexpensive and because they provide protection to the electrical apparatus within the casing and cover.

The casings and cover made from thermoplastic material have certain critical disadvantages. One such critical disadvantage is that the casings and covers tend to accumulate static charge. This static charge limits the operability of the electrical equipment since it tends to produce arcing between the casing and different electrical components in the casing and also tends to produce capacitive effects in the equipment. The equipment is accordingly unpredictable in operation and actually may not operate properly at times. The static charge also tends to produce arcing to any person trying to touch the casing.

The accumulation of static charges on casings and covers made from thermoplastic material has been recognized as a serious problem for many years. During this period of time, a considerable effort has been made to overcome such problem. In spite of such effort, the problem has continued to plague manufacturers and suppliers of electrical equipment. For example, the thermoplastic material now in use has either tended to accumulate static charges or has been so altered in properties as to be electrically conductive. Alternatively, the properties of the thermoplastic material have been altered so that the casings and covers formed from such materials have not provided adequate mechanical protection to the electrical equipment.

This invention provides thermoplastic material in which the accumulation of static charges is inhibited. The invention includes chemical components which are added to the thermoplastic material to reduce the electical resistivity of the material to a value which still causes the material to be electrically insulating while producing a leakage of electrical charges which tend to accumulate on a static basis on or in the material. The thermoplastic material constituting this invention is uniform throughout its volume so that the ability of the material to dissipate electrical charges continues indefinitely without any degradation in the properties of the material.

In one embodiment of the invention, polyethylene of high specific gravity is modified to inhibit the production of static charges. A weak salt having properties of ionizing and having its positive ions bond chemically to the polyethylene of high specific gravity is mixed in the polyethylene. A chemical agent is also dispersed in the polyethylene and is provided with properties of facilitating the dispersion of the positive ions of the weak salt throughout the polyethylene for chemical bonding to the polyethylene. The weak salt may be cupric acetate and the chemical agent may be an amine, preferably an ethoxylated amine.

The material of this invention may be formed as non-transparent bags or as sheets. The material may be formed by mixing the different chemicals and extruding the mixture under conditions of controlled temperatures and pressures and for controlled dwell times.

Figure 2:
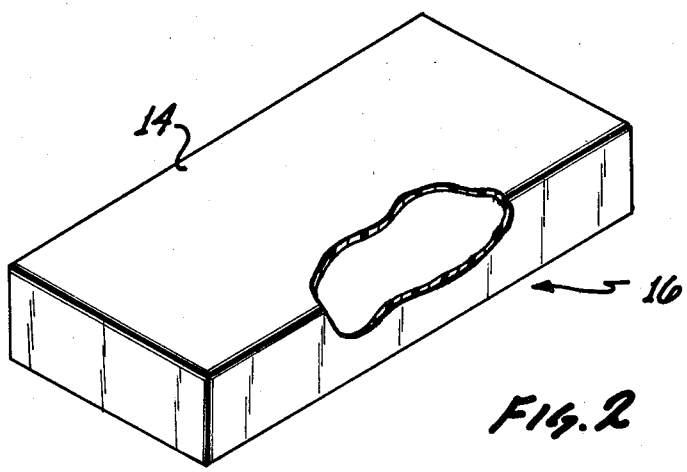

In the drawings:

FIG. 1 is a perspective view, partially broken away, of a first embodiment of the invention; and FIG. 2 is a perspective view, partially broken away, of a second embodiment of the invention.

In one embodiment of the invention, a polyethylene of high specific gravity is adapted to be modified to cause the material to be anti-static. The polyethylene of high specific gravity normally has an electrical resistivity of at least $10^{13}$ ohms. When the polyethylene has such a high electrical resistivity, it tends to accumulate static charges. However, when the polyethylene is modified to provide an electrical resistivity less than $10^{12}$ ohms, any static charges forming in the polyethylene tend to be dissipated. The modified polyethylene of this invention is particularly advantageous because it provides an electrical resistivity in the order of $10^6$ to $10^9$ ohms depending upon the humidity of the atmosphere. This resistivity provides for a dissipation of static charges while still causing the thermoplastic material to provide an electrical insulation.

The polyethylene may have a relatively high specific gravity such as in the order of 0.955 to 0.985. The polyethylene may be modified to reduce its electrical resistivity to the desired range of values and may then be formed as non-transparent bags of thin film for holding electrical equipment or as sheets. The sheets may be formed to serve as casings and covers for electrical equipment.

Certain materials are added to the polyethylene to modify the electrical characteristics of the polyethylene. For example, a weak salt having properties of ionizing is mixed with the polyethylene. The weak salt may be cupric acetate. When the weak salt is heated, it tends to ionize and the positive ions (the cupric ions) tend to vaporize and migrate through the polyethylene. As the ions migrate, they tend to form chemical bonds with the carbon atoms in the polyethylene. The chemical bonds formed tend to be double bonds. These double bonds are advantageous because they are stronger than a single bond and provide a greater electrical conductivity through the material than the single bond.

Dispersants such as amines are also mixed with the polyethylene to form the modified material of this invention. The amines have properties of flowing and mixing and blending well with polyethylene. Since the amines are hydrocarbon derivatives, they tend to become locked to the polyethylene structures. The amines serve as a dispersant for the cupric ions and facilitate the chemical bonding of the cupric ions to the polyethylene to produce an ionic path through the polyethylene.

Polyethylene of relatively high specific gravity is preferably not used for bags because it is desired generally that the bags be transparent so that the electrical equipment within the bags can be easily viewed. However, polyethylene of high specific gravity is quite satisfactory for use as sheets and can also be used for non-transparent bags. Preferably the polyethylene has a specific gravity in the order of 0.955 to 0.960. Specific gravities at the low end of the range are desirable to cause the material to be as amorphous as possible.

When the polyethylene has a relatively high specific gravity, a weak salt such as cupric acetate in a concentration of approximately twenty four (24) grams per one hundred pounds (100 lbs.) of polyethylene is preferably used. If the amount of cupric acetate in the mixture is excessive, the mixture will tend to be acidic. This is understandable because the polyethylene may corrode any metals which it may contact. If the amount of cupric acetate in the mixture is not sufficient, the polyethylene will not satisfactorily dissipate all of the static electricity accumulated on or in the polyethylene.

Ethoxylated amines are also preferably used. The ethoxylated amines preferably have a concentration of approximately ten hundred and forty four (1044) grams per one hundred pounds (100 lbs.) of polyethylene. If insufficient amine is included in the polyethylene, the polyethylene will not dissipate the static charge at a satisfactory rate. For example, the dissipation of the static charge may require a time as high as two (2) to five (5) seconds and even higher. If excessive amine is included in the polyethylene, the polyethylene will tend to feel greasy or oily.

The use of ethoxylated amines is desirable with polyethylene of high specific gravity because such amines facilitate the production of an amorphous structure in the polyethylene. An amorphous condition in the polyethylene is desirable because the polyethylene tends to have lengthened polymeric chains with double bonds. This is advantageous in providing a chemical bonding of the carbon atoms in the polyethylene with the cupric ions, particularly double bonding with the cupric ions. Such double bonding tends to facilitate the dissipation of the static charge in the polyethylene.

Ethoxylated amines have properties of flowing well through the polyethylene and blending well with the polyethylene. This is particularly true since both the amines and the polyethylene constitute hydrocarbon derivatives. The amines also tend to become bonded to the atoms in the polyethylene.

When the amorphous properties of the polyethylene of high specific gravity are increased, the characteristics of the polyethylene tend to change in other ways in addition to that described above. The hardness, tensile strength and impact strength of the polyethylene tend to decrease slightly such as in the order of one percent (1%) to five percent (5%). Any decrease in these properties of the polyethylene is so small as not to affect the properties of the polyethylene appreciably.

When ethoxylated amines are used with the polyethylene of high specific gravity, the amines tend to disperse throughout the polyethylene rather than being concentrated as a wax at the surface of the polyethylene. Furthermore, the density of the polyethylene tends to decrease slightly with the addition of the cupric acetate and the ethoxylated amines. This may result from the fact that the amorphous properties of the polyethylene increase. It may also result in part from the generation of an increased amount of gases from the cupric acetate.

The materials of this invention may be mixed and then extruded by the use of a conventional extruder. During the extrusion, the temperature of the material should preferably not exceed a limit such as approximately 420° F. Preferably, the temperature of the material during the extrusion is approximately 400° F. The pressure on the material should preferably not exceed a limit such as approximately one thousand pounds per square inch (1000 lb./sq.in.) when the extruder is not vented. When the extruder is vented, the pressure on the material can approach two thousand pounds per square inch (2000 lb./sq.in.).

The dwell time on the material during the extrusion preferably has a limit such as approximately ninety (90) seconds. This dwell time can be attained, if necessary, by disposing screens to partially block the flow of the material from the extruder. The dwell time should be properly regulated because an excessive dwell time will cause the material to become scorched.

When the extruder is vented, the amount of the cupric acetate in the mixture can be increased. This results from the fact that some of the cupric ions may escape from the mixture. The amount of the additional cupric acetate in the mixture depends upon the ability of the cupric ions to escape from the mixture during the extruding operation.

During the formation of the material at elevated temperatures, the cupric ions in the mixture become gaseous and migrate through the polyethylene mixture. The cupric ions tend to become bonded chemically to the carbon ions in the polyethylene. The chemical bonding between the cupric ions and the carbon ions in the polyethylene even tend to constitute double bonds. Such bonding tends to provide electrical charges for reducing the electrical resistivity while still retaining the polyethylene as an electrical insulator.

Other materials can be used in place of the cupric acetate and the amines. However, it is important that such materials have FDA approval and do not pose any safety threats to the customers and users of the material. For example, silver nitrate may be substituted for the cupric acetate in the mixture.

Although the invention has been described with reference to a particular embodiment, it is to be appreciated that various adaptations and modifications may be made and the invention is only to be limited by the appended claims.

I claim:
1. In combination for eliminating static charges by providing a resistivity of approximately $10^6$ to $10^9$ ohms,
   a polyethylene of high specific gravity,
   copper acetate dispersed in the polyethylene in a weight of approximately 24 grams per 100 pounds of polyethylene, and
   an ethoxylated amine dispersed in the polyethylene in a weight of approximately 1,044 grams per 100 pounds of polyethylene.

2. The combination set forth in claim 1 wherein the specific gravity of the polyethylene is between approximately 0.055 and 0.985.

3. A method of making anti-static material by providing a resistivity in the range of approximately $10^6$ to $10^9$ ohms, including the following steps:
   mixing polyethylene of a high specific gravity, copper acetate in a weight of approximately 24 grams per 100 pounds of polyethylene and an ethoxylated amine in a weight of approximately 1,044 grams per 100 pounds of polyethylene, and
   extruding the mixture of the polyethylene, the copper acetate and the ethoxylated amine at a controlled temperature less than approximately 420° F. and a controlled pressure less than 2,000 psi and with a controlled dwell time less than approximately 90 seconds.

4. The method set forth in claim 3 wherein the controlled pressure is less than approximately 1,000 psi for a non-vented extrusion and is less than approximately 2,000 psi for a vented extrusion.
5. The method set forth in claim 3 wherein the polyethylene has a specific gravity between approximately 0.955 and 0.985.
6. The method set forth in claim 5 wherein the temperature is approximately 400° F.
7. The method set forth in claim 6 wherein the controlled pressure is less than approximately 1,000 psi for a non-vented extrusion and is less than approximately 2,000 psi for a vented extrusion.

* * * * *